(12) United States Patent
Caldeira et al.

(10) Patent No.: US 9,395,045 B2
(45) Date of Patent: Jul. 19, 2016

(54) SYSTEMS AND METHODS FOR UNDERWATER STORAGE OF CARBON DIOXIDE

(71) Applicant: Elwha LLC, Bellevue, WA (US)

(72) Inventors: Kenneth G. Caldeira, Redwood City, CA (US); Philip A. Eckhoff, Bellevue, WA (US); Muriel Y. Ishikawa, Livermore, CA (US); Roderick A. Hyde, Redmond, WA (US); Lowell L. Wood, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 0 days.

(21) Appl. No.: 13/621,705

(22) Filed: Sep. 17, 2012

(65) Prior Publication Data
US 2014/0079594 A1    Mar. 20, 2014

(51) Int. Cl.
*F17C 1/00* (2006.01)
*F17C 1/16* (2006.01)

(52) U.S. Cl.
CPC . *F17C 1/007* (2013.01); *F17C 1/16* (2013.01); *B65D 2590/046* (2013.01); *F17C 2201/018* (2013.01); *F17C 2201/0109* (2013.01); *F17C 2201/0128* (2013.01); *F17C 2201/0166* (2013.01); *F17C 2201/0171* (2013.01); *F17C 2201/0176* (2013.01); *F17C 2201/052* (2013.01); *F17C 2203/066* (2013.01); *F17C 2203/0617* (2013.01); *F17C 2203/0619* (2013.01); *F17C 2203/0685* (2013.01); *F17C 2205/018* (2013.01); *F17C 2205/0157* (2013.01); *F17C 2205/0184* (2013.01); *F17C 2205/0323* (2013.01); *F17C 2205/0391* (2013.01); *F17C 2205/0394* (2013.01); *F17C 2221/013* (2013.01); *F17C 2223/0138* (2013.01); *F17C 2223/0153* (2013.01); *F17C 2223/035* (2013.01);
(Continued)

(58) Field of Classification Search
CPC ........ Y02C 10/12; Y02C 10/10; B65D 88/78; B63B 35/44; F17C 1/007; F17C 1/16
USPC .................. 405/53, 54, 129.1, 129.3, 129.45, 405/129.5, 129.55, 129.75, 129.9, 210; 220/560, 723; 588/250; 422/168; 585/15
See application file for complete search history.

(56) References Cited

U.S. PATENT DOCUMENTS 3,113,699 A * 12/1963 Crawford ............... B65D 88/78
                                                                    137/236.1
4,051,350 A *  9/1977 Parent ............................ 701/116
(Continued)

FOREIGN PATENT DOCUMENTS

JP      03164419 A      7/1991
JP      05004039 A      1/1993

OTHER PUBLICATIONS

Palmer et al., "Ocean Storage of Carbon Dioxide: Pipelines, Risers, and Seabed Containment", 2007.*
(Continued)

*Primary Examiner* — Benjamin Fiorello
*Assistant Examiner* — Carib Oquendo
(74) *Attorney, Agent, or Firm* — Foley & Lardner LLP

(57) ABSTRACT

An underwater carbon dioxide storage facility including a carbon dioxide deposit stored underwater as a clathrate includes a flexible barrier disposed at least partially over the carbon dioxide deposit. The carbon dioxide deposit may be stored in or at the bottom of a body of water.

41 Claims, 3 Drawing Sheets

(52) U.S. Cl.
CPC ..... *F17C2223/036* (2013.01); *F17C 2250/034* (2013.01); *F17C 2250/043* (2013.01); *F17C 2250/0426* (2013.01); *F17C 2250/0439* (2013.01); *F17C 2250/0478* (2013.01); *F17C 2250/0491* (2013.01); *F17C 2250/0678* (2013.01); *F17C 2260/044* (2013.01); *F17C 2270/0128* (2013.01); *Y02C 10/14* (2013.01)

(56) References Cited

U.S. PATENT DOCUMENTS

| | | | | |
|---|---|---|---|---|
| 4,190,072 | A | * | 2/1980 | Fernandez et al. ......... 137/236.1 |
| 4,433,940 | A | * | 2/1984 | Harrison ....................... 405/210 |
| 4,506,623 | A | * | 3/1985 | Roper et al. ................. 114/256 |
| 5,304,356 | A | | 4/1994 | Iijima et al. |
| 5,364,611 | A | | 11/1994 | Iijima et al. |
| 5,397,553 | A | | 3/1995 | Spencer |
| 5,820,300 | A | * | 10/1998 | Sonoda et al. ................ 405/188 |
| 6,108,967 | A | | 8/2000 | Erickson |
| 6,190,301 | B1 | | 2/2001 | Murray et al. |
| 6,598,407 | B2 | | 7/2003 | West et al. |
| 6,863,474 | B2 | * | 3/2005 | Webster et al. ............... 405/210 |
| 7,086,472 | B1 | * | 8/2006 | Incoronato ............ E21B 41/005 166/357 |
| 2003/0070435 | A1 | | 4/2003 | West et al. |
| 2008/0088171 | A1 | | 4/2008 | Cheng |
| 2011/0240303 | A1 | * | 10/2011 | Hallundbaek ................. 166/339 |
| 2012/0260839 | A1 | * | 10/2012 | Maher et al. .................. 114/257 |

OTHER PUBLICATIONS http://proceedings.asmedigitalcollection.asme.org/proceeding.aspx?articleID=1654525, Jun. 21, 2014.*

PCT International Search Report; International App. No. PCT/US2013/059948; Jan. 20, 2014; pp. 1-3.

10 Audacious Ideas to Save the Planet, Popular Science, printed on Oct. 9, 2012, retrieved from internet URL: www.popsci.com/environment/article/2008-06/10-audacious-ideas-save-planet?page=3, 7 pages.

Adams et al., Ocean Storage of C02, Elements, Oct. 2008, vol. 4, pp. 319-324.

Brewer et al., "Chapter 6: Ocean storage" IPCC Special Report on Carbon dioxide Capture and Storage, 2005, pp. 279-311.

Brewer et al., "Direct Experiments on the Ocean Disposal of Fossil Fuel CO2", Science, May 7, 1999, vol. 284, pp. 943-945.

Engineered Storage on the Abyssal Plane: Prospects for a New Approach to Ocean Carbon Storage, Online Abstract, printed on Oct. 9, 2012, retrieved from internet URL: www.abstractsonline.com/viewer/viewAbstract.asp?CKey=%7B179C3180-0130-4AB7-87AC-E8F7256EBA3D%7D&MKey=%7B581B5131-12E5-487A-88B6- 78ACCE1FF20A%7D&AKey=%7B82DF1193-261B-4248-AC6B-CACD0186BD6%7D&SKey=%7BD84434A8-2F84-4565-9357-16CC4C7AB8F0%7D, 1 page.

House et al., "Permanent carbon dioxide storage in deep-sea sediments", Proceedings of the National Academy of Sciences, Aug. 15, 2006, vol. 103, No. 33, pp. 12291-12295.

Nakashiki, "Lake-Type Storage Concepts for CO2 Disposal Option", Waste Management, 1997, vol. 17, No. 5/6, pp. 361-367.

Ohsumi, Takashi, "CO2 Storage Options in the Deep Sea", Marine Technical Journal, 1993, vol. 29, No. 3, pp. 58-66.

UNCW and OIMB Researchers, Colleagues Unlock Mysteries of Atlantic Deepwater Canyons, Marine Conservation Institute, printed on Oct. 9, 2012, retrieved from internet URL: www.mcbi.org/news/Carbon__18feb08, 3 pages.

* cited by examiner

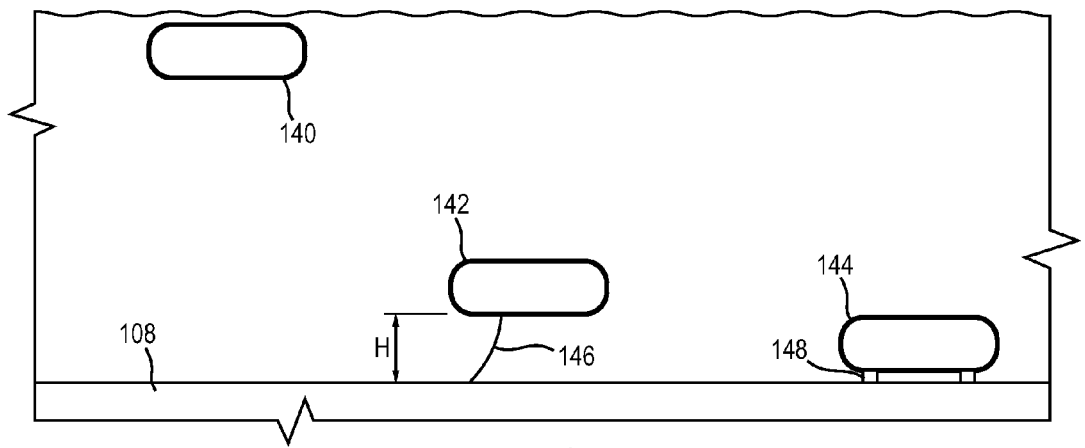
FIG. 4
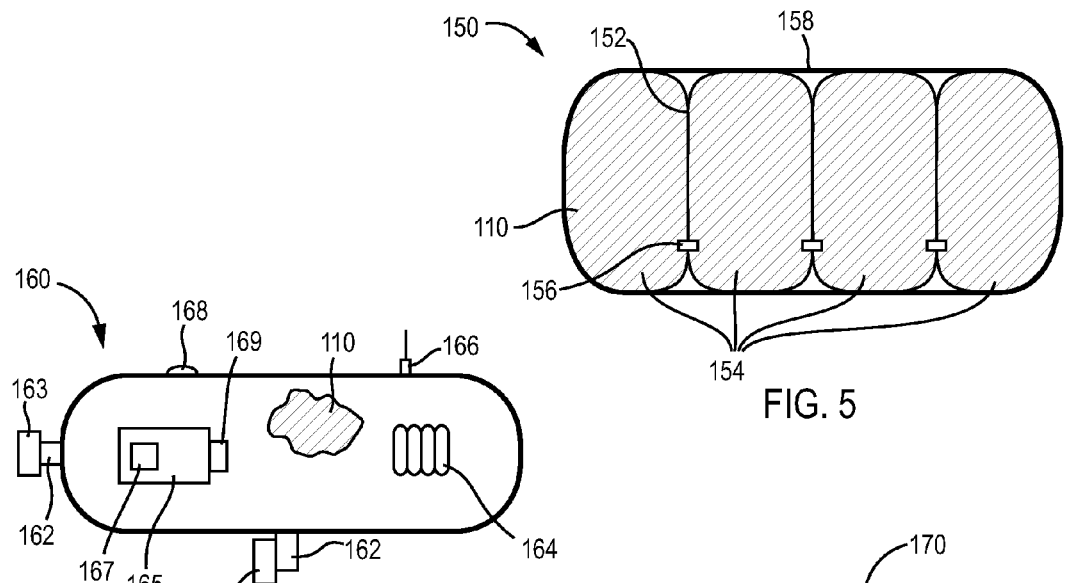
FIG. 5
FIG. 6
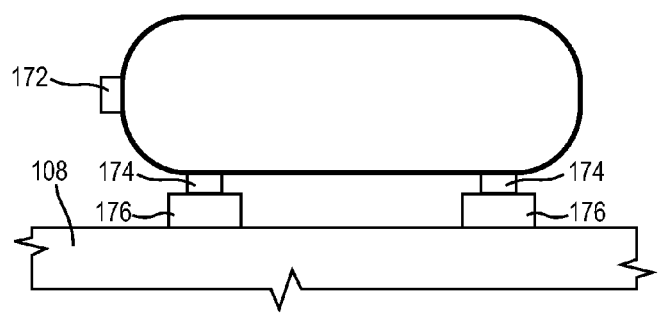
FIG. 7

SYSTEMS AND METHODS FOR UNDERWATER STORAGE OF CARBON DIOXIDE

BACKGROUND

The present application relates to the storage or sequestration of carbon dioxide. In particular, the present application relates to systems and methods for maintaining the integrity of stored carbon dioxide and monitoring such storage systems.

Carbon dioxide is a byproduct of the combustion of fossil fuels. Due to concerns relating to the increasing of carbon dioxide concentration levels in the atmosphere, people have proposed storing carbon dioxide in locations where the carbon dioxide is not freely emitted into the atmosphere. For example, the carbon dioxide maybe separated from the effluent of a coal plant and stored for a long period of time rather than being permitted to enter the atmosphere and increase the concentration of carbon dioxide in the atmosphere. One such way of sequestering carbon dioxide is in the ocean, such as described in U.S. Pat. No. 5,397,553 titled "Method and Apparatus for Sequestering Carbon Dioxide in the Deep Ocean or Aquifers."

SUMMARY

One exemplary embodiment of the invention relates to an underwater carbon dioxide storage facility including a carbon dioxide deposit stored underwater as a clathrate and a flexible barrier disposed at least partially over the carbon dioxide deposit.

Another exemplary embodiment relates to a method of storing carbon dioxide underwater. The method includes receiving carbon dioxide at an underwater storage location and at least partially covering the carbon dioxide in the storage location with a flexible barrier.

Still another exemplary embodiment relates to a method of storing carbon dioxide underwater. The method includes at least partially filling a storage container with a carbon dioxide clathrate where the storage container is a bladder, and moving the storage container to an underwater storage location in a body of water.

Yet another exemplary embodiment relates to a system for maintaining an underwater stored carbon dioxide deposit. The system includes a flexible barrier covering at least a portion of a stored carbon dioxide deposit, where the carbon dioxide deposit is in the form of at least one of a liquid or a clathrate; a sensor configured to provide a signal indicative of the status of the carbon dioxide deposit; and a transmitter configured to send the signal indicative of the status of the carbon dioxide deposit to a remote location.

Yet another exemplary embodiment relates to a system for storing carbon dioxide underwater. The system includes an underwater storage site; a source of carbon dioxide; a reactor configured to convert the carbon dioxide into a carbon dioxide clathrate; a filling station configured to deliver the carbon dioxide to the storage site; and a flexible barrier configured to cover at least a portion of the carbon dioxide in the storage site.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

The invention will become more fully understood from the following detailed description, taken in conjunction with the accompanying drawings, wherein like reference numerals refer to like elements, in which:

FIG. 4 is an elevation view of three carbon dioxide containers located at various depths in a body of water.

FIG. 5 is a sectional view of a carbon dioxide storage container according to an exemplary embodiment.

FIG. 6 is an elevation view of a carbon dioxide storage container in accordance with an exemplary embodiment.

FIG. 7 is an elevation view of a carbon dioxide storage container coupled to a docking station according to an exemplary embodiment.

DETAILED DESCRIPTION

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Figure 1:
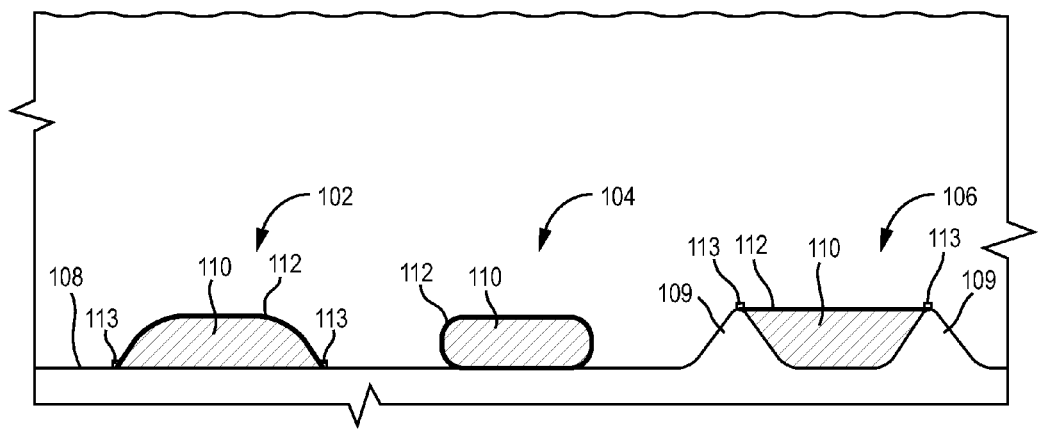
FIG. 1 is schematic view of multiple potential configurations of under water carbon dioxide storage sites.

Referring to FIG. 1, three storage sites 102, 104, and 106 for carbon dioxide 110 are shown in accordance with three exemplary embodiments. Storage sites 102, 104, and 106 are shown to contain carbon dioxide 110 in some form resting on the ocean floor 108. In other embodiments storage sites 102, 104, and 106 may be in other locations, such as under other bodies of water such as lakes or other locations where the conditions are suitable for storage. The carbon dioxide may be gathered from a source such as a fossil fuel plant where it is produced as a byproduct along with other combustion gasses. The carbon dioxide 110 may be stored in different forms depending upon the desired storage configuration and the conditions of the storage site. For example, carbon dioxide 110 may be stored as a liquid, as a carbon dioxide clathrate, or as a carbon dioxide hydrate, which is a clathrate in which the host material comprises water (fresh water or seawater). References to carbon dioxide clathrates herein are intended to be inclusive of carbon dioxide hydrates. The carbon dioxide clathrate may be formed in a clathrate reactor, for example, as a product of high pressure oxygen rich combustion of a hydrocarbon. Other combustion gasses may or may not be separated out before forming the clathrate. Storing the carbon dioxide 110 as a clathrate under water may have certain advantages relating to the required pressure and temperature to maintain the clathrate in a stable configuration. Storage of a carbon dioxide clathrate is discussed in U.S. Pat. No. 5,397,553. Further reference may be made to Intergovernmental Panel on Climate Change, *Special Report on Car-*

*bon Dioxide Capture and Storage*, Cambridge University Press (2005) (with particular reference to Chapter 6 "Ocean Storage" and Section 6.2.1.3 "Basic behaviour of $CO_2$ released in different forms"). This document discusses the pressure and temperature stability regimes for underwater storage of carbon dioxide clathrates and liquid carbon dioxide. Storage as a clathrate can provide some advantages over storage as a liquid. One possible advantage is that the less stringent pressure and temperature requirements for clathrate storage allow storage at shallower depths than storage as a liquid. Additionally, a greater fraction of the ocean volume satisfies the pressure and temperature conditions for clathrate storage than for liquid storage. Another possible advantage of clathrate storage versus liquid storage is the greater structural integrity and environmental isolation offered by solid-phase carbon dioxide clathrates compared to liquid carbon dioxide.

Referring again to FIG. 1, storage sites 102, 104, and 106 each include a deposit of carbon dioxide 110 in some form at least partially covered with a barrier, shown as, but not limited to cover 112 (e.g., bladder, bag, membrane, etc.). In the embodiment shown in FIG. 1, cover 112 shown with respect to sites 102, 104, and 106 may be utilized to prevent migration of the carbon dioxide 110 (e.g. in ocean currents). Because storage of carbon dioxide 110 may be desired for a long period of time (e.g. hundreds of years), even low rates of migration due to slowly moving ocean currents or other naturally occurring processes may result in a significant portion of the stored carbon dioxide 110 being leached away. The cover or bladder 112 is intended to maintain the structural integrity of carbon dioxide 110 storage site and prevent direct contact of carbon dioxide 110 with water currents or other processes that would result in leakage or movement of carbon dioxide 110 away from the intended storage site. In an exemplary embodiment, the barrier (e.g., cover 112) is flexible (in contrast to a rigid tank, capsule, or other pressure vessel such as may be found on a ship or submarine).

In one embodiment, as shown with respect to storage site 104, cover 112 may substantially encompass carbon dioxide 110. In another embodiment, as shown with respect to storage sites 102 and 106, cover 112 may instead cover a portion of carbon dioxide 110 while the remaining carbon dioxide 110 (in whatever form) is in direct contact with ocean floor 108 or structures 109 rising from ocean floor 108. For example, cover 112 may overlay the top and sides of carbon dioxide deposit 110, as shown with respect to storage site 102, or may overlay only a top portion of carbon dioxide deposit 110, as shown with respect to storage site 106. Such a cover 112 that only covers a portion of carbon dioxide 110 may be advantageous relative to a complete cover due to less material being used. Cover 112 may be coupled to floor 108 or a structure 109 rising from floor 108 at one or more points (e.g., around the periphery of cover 112) with one or more anchors 113. In embodiments where the cover 112 is flexible, the cover 112 may be folded, rolled, or otherwise compacted for ease of delivery to the site of the carbon dioxide deposit 110.

Figure 2:
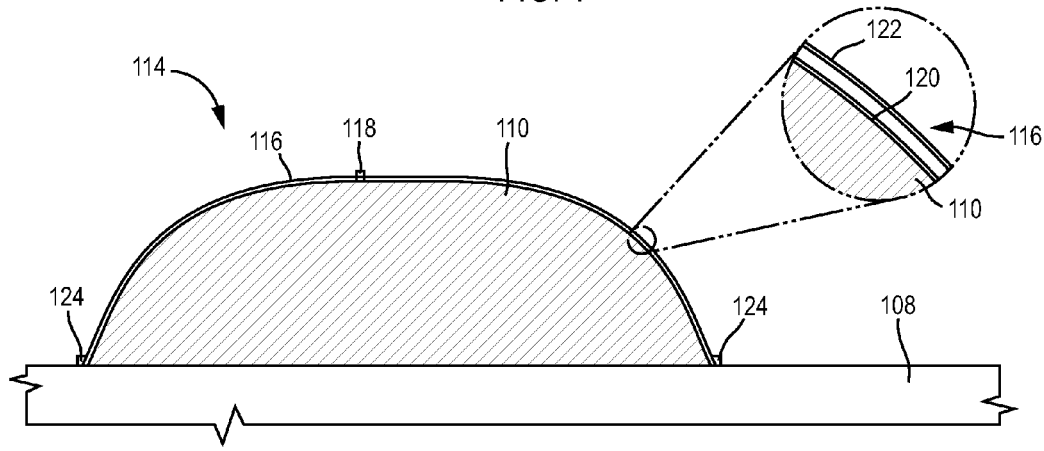
FIG. 2 is a sectional view of a carbon dioxide storage site according to an exemplary embodiment.

Referring to FIG. 2, a carbon dioxide storage site 114 according to another exemplary embodiment similar to storage site 102 includes stored carbon dioxide 110 maintained between ocean floor 108 and a cover shown as a barrier layer 116. In operation, storage site 114 may be created by generating the compound in which carbon dioxide 110 is stored (e.g. a carbon dioxide clathrate), delivering carbon dioxide deposit 110 to a location on ocean floor 108, and covering carbon dioxide deposit 110 with barrier 116. In some embodiments, barrier 116 may be put into place after storage site 114 has been completely filled with carbon dioxide 110 while in other embodiments, barrier 116 may be put into place prior to adding any of carbon dioxide 110 or after site 114 has been partially filled with carbon dioxide 110. If barrier 116 is put into place prior to storage site 114 being completely filled with carbon dioxide 110, a valve 118 may be used to provide for the input of further carbon dioxide 110 until storage site 114 has been filled. Valve 118 may be configured in various ways in order to function appropriately given the size, pressure, temperature, material composition, and so forth of the carbon dioxide 110. Valve 118 may be an active valve or a passive valve. Valve 118 may prevent water from passing through barrier 116 or may allow water to pass through barrier 116 to contact or mix with stored carbon dioxide 110.

Further referring to FIG. 2, barrier 116 may include multiple layers of materials, the multiple layers having varying functions. For example, a first layer 120 may be an interior layer that is selected to interface directly with carbon dioxide 110 stored within storage site 114. An outer layer 122 may be configured to provide structural integrity and may be selected to interface directly with the water, debris, sediment, or flora and fauna in the water. First layer 120 may be configured to prevent diffusion of carbon dioxide 110 through first layer 120 to the outside of storage site 114 while at the same time allowing water to diffuse into storage site 114. The porosity of outer layer 122 with respect to either the stored carbon dioxide 110 or the surrounding water, on the other hand, may not be a consideration if first layer 120 with the desired porosity is already in place. Instead, outer layer 122 may be configured to provide structural integrity to barrier 116 and may therefore be a mesh or have various material types that would not suffice as a single layer but perform well as part of a multiple layer barrier 116. In other embodiments, the barrier 116 may include further layers to serve different functions and provide structural integrity as desired.

Further referring to FIG. 2, an anchor or tether 124 or multiple anchors or tethers 124 may be used to secure barrier 116 to ocean floor 108. The tethers 124 may be configured to secure multiple barriers as may be desired (e.g., multiple containers of carbon dioxide connected to a single guy wire). Tethers 124 may be put into place after storage site 114 has been filled with carbon dioxide 110. In other embodiments, for example, where the properties of the ocean would not disrupt placement of barrier 116, tethers 124 may not be required. For example, storage site 106 shown in FIG. 1 may simply have a cover 112 on the top of the carbon dioxide 110 and not utilize any tethers between cover 112 and ocean floor 108 or structures 109 on ocean floor 108. The mass of cover 112 in such an embodiment without tethers would be sufficient to maintain cover 112 in place over the carbon dioxide in suitable environmental conditions.

Figure 3:
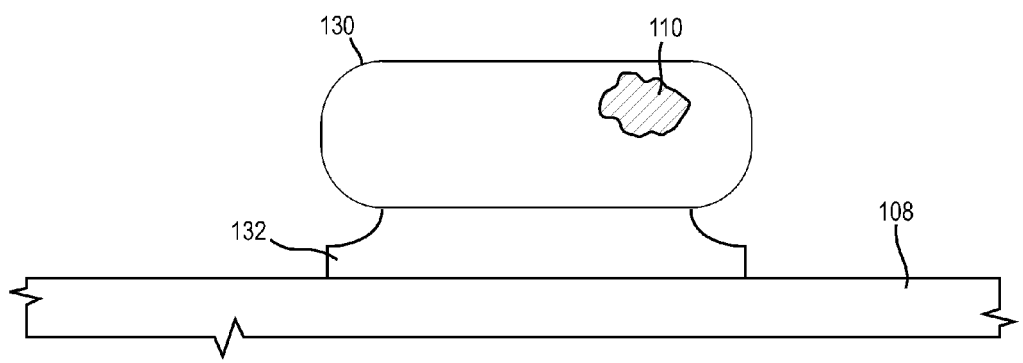
FIG. 3 is an elevation view of a carbon dioxide storage container coupled to a mooring structure according to an exemplary embodiment.

Referring to FIG. 3, a container 130 according to an exemplary embodiment may fully encompass carbon dioxide 110, effectively functioning as a bladder (e.g., similar to cover 112 shown with respect to storage site 104 in FIG. 1). Container 130 may be constructed with multiple layers such as shown in FIG. 2 and may also have other components shown with respect to other storage sites. In one embodiment, container 130 is configured to be moored to a mooring structure 132, mooring structure 132 located in a desired location for storage of container 130. In one embodiment, mooring structure 132 may be placed on floor 108 at the bottom of the ocean or body of water in a desired location. In another embodiment, mooring structure 132 may be placed at some depth above floor 108 of the ocean or other body of water. The coupling mechanism between container 130 and mooring structure 132 may take various forms depending upon the size of the container and the forces expected on the container (e.g. ocean currents).

Referring to FIG. 4, three containers 140, 142, and 144 are shown in different locations to further demonstrate the discussion with respect to FIG. 3. Because the containers fully encompass carbon dioxide 110, the containers may be moved to different locations in the body of water, including different depths below the surface of the water as desired (e.g. to maintain appropriate pressure and temperature for stable storage of whatever form of carbon dioxide 110 is selected or to move the container away from an initial filling station so that more containers can be filled from the same location). For example, a container 140 is shown at a relatively shallow depth below the surface of the water as may be desired for an initial filling location. Container 142 is shown floating at a level H above floor 108 of the ocean. Depending upon the selected depth in the ocean, the container 142 may be buoyant, while in other circumstances, the container 142 may have a neutral buoyancy. In some cases, due to the density of carbon dioxide clathrates compared to seawater, the container may include flotation gas to provide additional buoyancy. Because it may be desirable to change the buoyancy of the carbon dioxide deposit, the container 142 may further include a buoyancy control device (e.g., as is known in the submarine field) to maintain the carbon dioxide deposit within a selected depth range. In one embodiment, the buoyancy control device is a buoyancy engine, such as used to propel sea gliders (using a hydraulic system to inflate a bladder to control the density of the container). Container 142 may be tethered to floor 108 using a tethering structure 146 designed to maintain the location of the container 142 notwithstanding various forces acting on container 142. Container 144 is shown anchored to the ocean floor 108 to maintain the secure placement of container 144. In one embodiment a single anchor 148 may be utilized to secure container 144 to floor 108. In other embodiments, multiple anchors 148 may be utilized to secure container 144 to floor 108. Further, a single anchor 148 may be used to secure multiple containers in some embodiments. Anchors 148 may interface directly with ocean floor 108 or anchors 148 may be coupled to corresponding devices on floor 108 such as mooring structure 132 shown in FIG. 3.

Referring to FIG. 5, a container 150 for storing carbon dioxide 110 is shown according to an exemplary embodiment to include a number of baffles 152 (e.g., dividers, interior walls, separators, etc.) that separate container 150 into interior compartments 154, each containing carbon dioxide 110. Baffles 152 may include valves 156 that allow movement of the carbon dioxide 110 between compartments 154. While four compartments 154 are shown in FIG. 5, any number of compartments 154 may be constructed within container 150 depending upon the desired size, configuration, and storage capacity of the container 150. In one embodiment, baffles 152 provide a mechanism to separate areas of container 150 to mitigate the consequences of a breach in one area of the container (i.e. by maintaining the integrity of the non-breached compartments 154). Like the embodiment shown in FIGS. 1-4, container 150 may have an outer layer 158 that is constructed of a different material than baffles 152, and outer layer 158 may have multiple layers if desired. Further, container 150 may have a structure for being tethered or moored to another structure or the ocean bottom and may also include a valve that permits the container to be filled and/or release carbon dioxide as desired.

Referring to FIG. 6, in an exemplary embodiment, a container 160 completely encompasses a volume of carbon dioxide 110. A propulsion device, shown as, but not limited to, propulsion engine 162 is coupled to container 160 and powers a propulsion system 163 known in the art, such as a propeller to move container 160 within the body of water to a selected special region. In an exemplary embodiment, the propulsion engine 162 is a similar to that used to propel underwater/sea gliders (including a density control system and wings for low power propulsion). Multiple propulsion engines 162 may be used depending on the size and configuration of container 160 and the location to which container 160 is to be moved. The type of engine 162 utilized on container 160 and related propulsion system 163 may be selected from systems commonly used at substantial depths under water to move submersible objects. The embodiment shown in FIG. 6 may be used where container 160 is filled with carbon dioxide 110 in one location but then moved to a long term storage location away from the filling location. In some embodiments, the container 160 may not have its own propulsion capability, but be towed to the long term storage location by a separate vehicle which may then return to the filling station to pick up and tow a second container. The long term storage location may be at the same depth as the filling location or may be at a different depth, such as at the floor of the ocean. Weights 164 may be added to container 160 to aid in moving container 160 to the correct depth or to equalize the mass of container 160 relative to the ocean pressure to achieve the desired balance. In one embodiment, a transmitter 166 is used to transmit the location of container 160 to a remote receiver (e.g., on a ship, on another container, on land, etc.). The transmitter 166 may be a beacon to inform nearby vessels of their proximity to the container 160. Depending upon the depth of the container 160, the transmitter 166 (or multiple transmitters) may use different types of signals. For example, the transmitter 166 may be acoustic when mounted at container 160. In other embodiments, the transmitter may be located remote from container 160 and be operatively coupled to the container 160 via a communications channel (e.g., using optical or radiofrequency (RF) communication). For example, a communications channel may include an optical fiber, a conductor, a coaxial cable, or other physical communications connector. The communications channel may also involve shortrange wireless transmission, such as a low-power acoustic link between the container and a higher power, longer range transmitter at or near the surface.

Because it is unlikely that it would be necessary to move container 160 at a high speed, engine 162 and propulsion system 163 may instead be configured to utilize a small amount of energy sufficient to transport container 160 to a long term storage location. In other circumstances (e.g., where a change of ocean conditions requires movement of container 160 or container 160 has lost structural integrity) engine 162 and propulsion system 163 may be configured to again move container 160 to a different depth, location, or to a facility for repair.

Referring further to FIG. 6, a sensor 168 or multiple sensors 168 may be coupled to container 160 to sense various parameters. For example, a sensor 168 may indicate the location of container 160 (e.g. an inertial sensor as would be found in an inertial navigation system). For example, gravitational or magnetic sensors may be used to locate the container by comparison to pre-mapped gravitational or magnetic regional properties. For example, acoustic sensors may be used to detect signals from remote acoustic beacons, and thereby enable determination of the location of the container. A GPS system may be utilized to aid in the location detection, e.g., by using a GPS receiver at or near the surface of the body of water in communication with the container 160, which may be located at a depth at which GPS signals cannot be received. In another embodiment, sensor 168 may indicate the depth of container 160 (e.g. via a pressure sensor). Other example sensor types may sense information such as temperature in container 160, pressure in container 160, filled volume of container 160, the status of the contents of container 160 (e.g., carbon dioxide stored as a liquid or as a carbon dioxide clathrate), whether container 160 has maintained its structural integrity, etc. The type of sensors may be selected based upon what parameters are to be sensed (e.g. a temperature sensor, an acoustic sensor, a magnetic sensor, a gravitational sensor, etc.). Sensor 168 may provide a signal indicative of the sensed parameter to a control system 165. In one embodiment, sensor 168 may provide a signal representing the sensed parameter to transmitter 166 that transmits the signal to a receiver at a remote location. Transmitter 166 may be a wireless transmitter or may be wired to the remote location in some fashion. If transmitter 166 is a wireless transmitter, RF technology may be used to transmit the wireless information as is known in the art. Local control system 165 on container 160 may include a receiver or inputs 167 for receiving data, such as from sensor 168, and a processor 169 programmed to act upon the received information. For example, the receiver may receive a query for information from the sensor 168 (e.g., the status or position of the container 160). The processor may instruct sensor 168 to take more readings or instruct a transmitter 166 to provide data to a remote receiver.

Referring to FIG. 7, a carbon dioxide container 170 may include mechanical supports 172 and 174 used for a number of functions. For example, mechanical supports 172 and 174 can aid in the structural integrity of the container as necessary. Further mechanical supports 172 and 174 may be used to couple the container 170 to another container having a mechanical support that interfaces appropriately or to a docking station 176, for example on ocean floor 108 as shown in FIG. 7. Mechanical supports 172 and 174 aid in providing an offset between container 170 and other structures in the ocean (e.g. the ocean floor 108) to ensure that structures on ocean floor 108 do not damage the outer layers of container 170 (e.g., a barrier layer configured to contain carbon dioxide 110).

In another embodiment, components similar to transmitter 166, one or more sensors 168, and local control system 165 may be provided for other storage sites described above, such as shown in FIG. 1 (storage sites 102 and 106) and FIG. 2 (storage site 114) in which cover 112 or multi-layer barrier 116 is coupled directly to floor 108 or structure 109 rising from floor 108 or as shown in FIG. 1 (storage site 104), FIG. 3, FIG. 4, FIG. 5, or FIG. 7. For example, cover 112 or barrier 116 may include a sensor such as a GPS sensor configured to determine the location of carbon dioxide 110 and a transmitter configured to transmit the location to a remote location. Cover 112 or barrier 116 may further include other sensors, such as a sensor to sense the properties of carbon dioxide 110 (e.g., the amount of enclosed clathrate, the carbon dioxide content of the deposit) and cover 112 or barrier 116 itself (e.g., whether cover 112 or barrier 116 has ruptured). The sensors may provide a signal indicative of the sensed parameter to a control system and the control system may provide the signal to the transmitter to be transmitted to a receiver at a remote location or may be programmed to act upon the received information.

Figure 8:
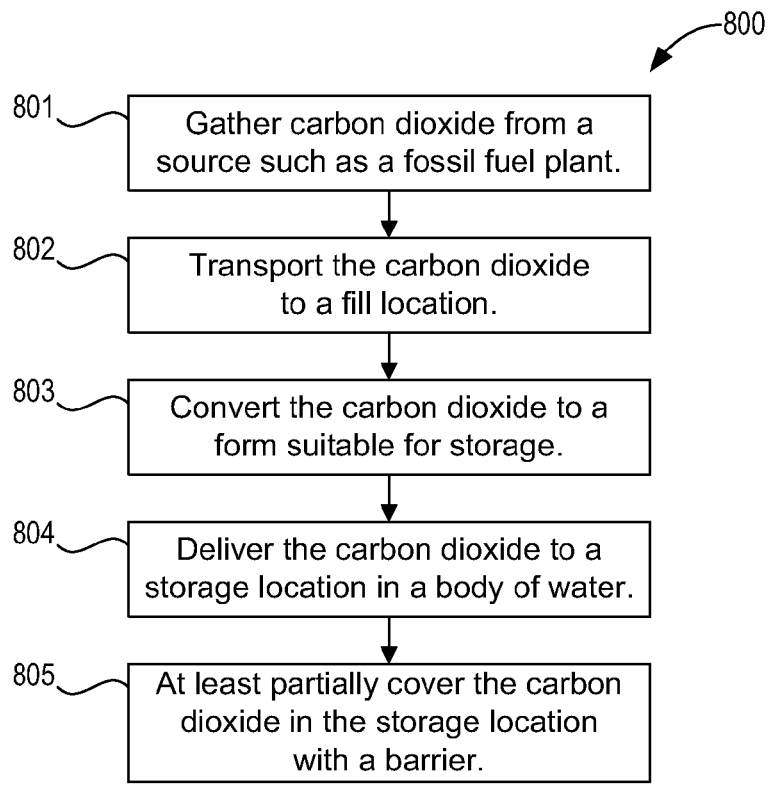
FIG. 8 is a flow chart of a process for storing carbon dioxide according to an exemplary embodiment.

Referring to FIG. 8, a process 800 for storing carbon dioxide is shown according to an exemplary embodiment. Carbon dioxide is gathered from a source such as a fossil fuel plant (step 801). There are known technologies for stripping out the carbon dioxide from the effluent stream. Because the plant may not be located near a facility appropriate for storage of carbon dioxide, the carbon dioxide that is stripped out of the effluent stream is delivered to the storage facility (step 802) utilizing technologies such as a pipeline where the carbon dioxide is maintained under the appropriate pressure, or via a tanker truck, rail car, etc. Once at the storage facility, the carbon dioxide may be combined with water to create a clathrate or converted into another form suitable for storage such as a pressurized liquid or a clathrate (step 803). Step 803 may be performed using a reactor to create the carbon dioxide clathrate using appropriate input streams as is known in the art. The carbon dioxide is then delivered to the storage location in a body of water (step 804). For example, the carbon dioxide may be placed into a container such as any one of the containers shown in FIGS. 1-7 and the container moved to a storage location in a body of water. Initial placement of the carbon dioxide into the container may be accomplished using a filling station (e.g., a land or water based system configured to deliver the carbon dioxide (e.g., clathrate) to the container via a pumping station or other appropriate delivery means. When utilizing a container such as shown in FIG. 1 (storage sites 102 and 106) and FIG. 2 (storage site 114), the carbon dioxide may be placed into the storage location (e.g. by piping it under water to the appropriate location). Once the carbon dioxide is delivered to the storage location, the carbon dioxide is at least partially covered with a barrier or cover.

Figure 9:
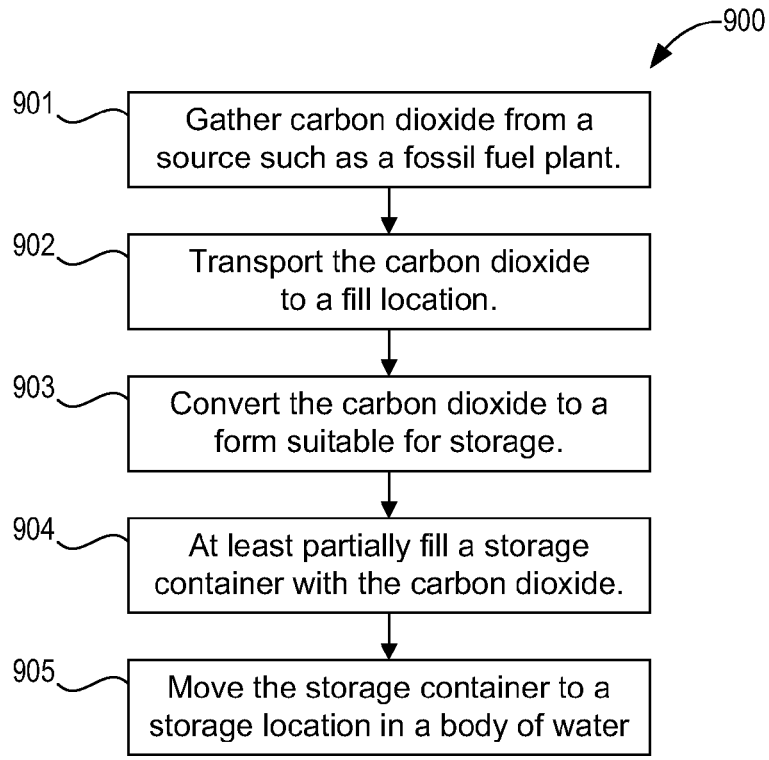
FIG. 9 is a flow chart of a process for storing carbon dioxide according to another exemplary embodiment.

Referring to FIG. 9, a process for storing carbon dioxide is shown according to another embodiment. In the process 900, the carbon dioxide is separated from a waste stream and gathered in manner similar to that described in process 800 (step 901). The carbon dioxide is transported to a fill location at a storage facility (step 902) and combined with water to form a carbon dioxide clathrate (step 903). After formation of the carbon dioxide clathrate, a storage container may then be at least partially filled (step 904). In one embodiment, the carbon dioxide is loaded into a container such as that shown in FIGS. 3, 4, 6, and 7 where the carbon dioxide is completely enclosed by a barrier (step 904). The container is moved to a storage location in a body of water (step 905). Selection of the storage location may depend upon a number of factors including space considerations, buoyancy considerations (depending upon the form of storage, the carbon dioxide density may be greater or less than that of the surrounding water at certain depths), stability considerations (depending upon the form of storage, carbon dioxide remains stable at certain pressure and temperature ranges), and so forth. See the Intergovernmental Panel on Climate Change, *Special Report on Carbon Dioxide Capture and Storage*, Chapter 6 (2005) for more information on the physical properties of carbon dioxide at different temperatures and pressures in sea water. In certain embodiments, it may be advantageous to store carbon dioxide clathrate at depths below 500 meters in the ocean and to store liquid carbon dioxide at depths below 3000 meters.

In another embodiment of the processes of FIGS. 8 and 9, the cover is placed onto the carbon dioxide fill location in the body of water and tethered at one or more points to the sea floor 108 with respect to storage site 102 to formation or structure 109 rising from the floor 108 with respect to storage site 106 (see FIG. 1).

In another embodiment of the processes of FIGS. 8 and 9, another step of transporting a partially or a fully filled container to another location after filling is included, such as an embodiment in which the container includes its own engine and propulsion device such as shown in FIG. 6, or by using another means of moving the container, such as on a track, a line, being towed, etc.

In another embodiment of the processes of FIGS. 8 and 9, the carbon dioxide may be converted into a form suitable for storage, such as a pressurized liquid or a clathrate prior to being transported to a storage facility.

It is important to note that the construction and arrangement of the elements of the systems and methods as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the enclosure may be constructed from any of a wide variety of materials that provide sufficient strength or durability, in any of a wide variety of colors, textures, and combinations. Additionally, in the subject description, the word "exemplary" is used to mean serving as an example, instance or illustration. Any embodiment or design described herein as "exemplary" is not necessarily to be construed as preferred or advantageous over other embodiments or designs. Rather, use of the word exemplary is intended to present concepts in a concrete manner. Accordingly, all such modifications are intended to be included within the scope of the present inventions. The order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes, and omissions may be made in the design, operating conditions, and arrangement of the preferred and other exemplary embodiments without departing from scope of the present disclosure or from the spirit of the appended claims.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. An underwater carbon dioxide storage facility, comprising:
   a carbon dioxide deposit stored underwater as a clathrate in a first area;
   a flexible barrier disposed at least partially over the carbon dioxide deposit, the flexible barrier comprising a first layer and a second layer; and
   a valve that fluidly couples the first area inside the flexible barrier with a second area outside the flexible barrier and configured to regulate a flow of fluid through the flexible barrier;
   wherein the first layer is water permeable and disposed between the carbon dioxide deposit and the second layer; and
   wherein the second layer is a water permeable bladder.

2. The carbon dioxide storage facility of claim 1, wherein at least a portion of the second layer is water impermeable.

3. The carbon dioxide storage facility of claim 1, wherein the barrier completely encloses the carbon dioxide deposit.

4. The carbon dioxide storage facility of claim 1, wherein the barrier only partially encloses the carbon dioxide deposit.

5. The carbon dioxide storage facility of claim 4, wherein the barrier is a cover on the top of the carbon dioxide deposit.

6. The carbon dioxide storage facility of claim 4, wherein the barrier covers the top and sides of the carbon dioxide deposit.

7. The carbon dioxide storage facility of claim 1, wherein the barrier comprises at least three layers.

8. The carbon dioxide storage facility of claim 7, wherein one layer provides structural reinforcement to the barrier.

9. The carbon dioxide storage facility of claim 7, wherein one layer provides an impermeable barrier.

10. The carbon dioxide storage facility of claim 7, wherein one layer is configured to be an outer layer in contact with water.

11. The carbon dioxide storage facility of claim 7, wherein one layer is configured to be an inner layer in contact with the clathrate.

12. The carbon dioxide storage facility of claim 7, wherein one layer is configured to interact with at least one of fauna and flora.

13. The carbon dioxide storage facility of claim 1, further comprising a sensor configured to sense at least one of the amount of enclosed clathrate, the carbon dioxide content of the deposit, the temperature of the deposit, the pressure of the deposit, and whether the barrier has ruptured.

14. The carbon dioxide storage facility of claim 1, further comprising a valve configured to permit selective fluid transport through the barrier.

15. A system for maintaining an underwater stored carbon dioxide deposit, comprising:
   a flexible barrier covering at least a portion of the stored carbon dioxide deposit in a first area, the flexible barrier comprising a first layer and a second layer, wherein the first layer is water permeable and disposed between the carbon dioxide deposit and the second layer, wherein the second layer is a water permeable bladder, wherein the stored carbon dioxide deposit is in the form of at least one of a liquid or a clathrate, wherein the carbon dioxide deposit is anchored to a structure to keep the carbon dioxide deposit in place, wherein the carbon dioxide deposit is positioned above the bottom of the body of water, and wherein the carbon dioxide deposit is positively buoyant;

a valve that fluidly couples the first area inside the flexible barrier with a second area outside the flexible barrier and configured to regulate a flow of fluid through the flexible barrier;

a sensor configured to provide a signal indicative of a status of the carbon dioxide deposit; and a transmitter configured to send the signal indicative of the status of the carbon dioxide deposit to a remote location.

16. The system of claim 15 wherein the carbon dioxide deposit is located at an underwater location which provides a temperature and pressure selected to stabilize the deposit.

17. The system of claim 15, wherein the carbon dioxide deposit rests on the bottom of a body of water.

18. The system of claim 15, further comprising a buoyancy control device configured to maintain the carbon dioxide deposit within a selected depth range.

19. The system of claim 15, further comprising a propulsion device configured to maintain the carbon dioxide deposit within a selected spatial region.

20. The system of claim 15, further comprising a beacon to inform nearby vessels of their proximity to the carbon dioxide deposit.

21. The system of claim 15, wherein the transmitter is located remote from the carbon dioxide deposit and operatively coupled to the carbon dioxide deposit via a communications channel.

22. The system of claim 15, further comprising a transmitter configured to transmit the location of the carbon dioxide deposit to a remote location.

23. The system of claim 22, further comprising a sensor configured to determine the location of the carbon dioxide deposit.

24. The system of claim 15, wherein the sensor is configured to sense at least one of the carbon dioxide content of the deposit, the temperature of the deposit, the pressure of the deposit, and whether the barrier has ruptured.

25. The system of claim 15, further comprising a receiver configured to receive a query for information from the sensor.

26. The system of claim 25, wherein the receiver is remote from the carbon dioxide deposit and operatively coupled to the carbon dioxide deposit via a communications channel.

27. The system of claim 15, further comprising a valve configured to permit selective fluid transport through the barrier.

28. A system for storing carbon dioxide underwater, comprising:

an underwater storage site;

a source of carbon dioxide;

a reactor configured to convert the carbon dioxide into a carbon dioxide clathrate;

a filling station configured to deliver the carbon dioxide clathrate to a carbon dioxide deposit in a first area at the storage site;

a flexible barrier configured to cover at least a portion of the carbon dioxide clathrate in the carbon dioxide deposit, the flexible barrier comprising a first membrane and a second membrane, wherein the first membrane is water permeable and disposed between the carbon dioxide deposit and the second membrane, and wherein the second membrane is a water permeable bladder; and a valve that fluidly couples the first area inside the flexible barrier with a second area outside the flexible barrier and configured to regulate a flow of fluid through the flexible barrier.

29. The system of claim 28, wherein at least a portion of the barrier is impermeable.

30. The system of claim 28, wherein the barrier completely encloses the carbon dioxide clathrate.

31. The system of claim 28, wherein the first layer comprises a bladder.

32. The system of claim 28, wherein the barrier only partially encloses the carbon dioxide clathrate.

33. The system of claim 28, wherein the carbon dioxide deposit rests on the bottom of a body of water.

34. The system of claim 33, wherein the carbon dioxide deposit is anchored to a structure to keep the carbon dioxide deposit in place.

35. The system of claim 34, wherein the structure is configured to anchor multiple carbon dioxide deposits.

36. The system of claim 33, wherein the carbon dioxide deposit is anchored to the bottom of the body of water.

37. The system of claim 28, further comprising a buoyancy control device configured to maintain the carbon dioxide deposit within a selected depth range.

38. The system of claim 28, further comprising a propulsion device configured to maintain the carbon dioxide deposit within a selected spatial region.

39. The system of claim 28, further comprising a beacon to inform nearby vessels of their proximity to the carbon dioxide deposit.

40. The system of claim 28, further comprising a sensor configured to sense a status of the carbon dioxide deposit.

41. The system of claim 40 wherein the sensor is configured to measure at least one of the amount of enclosed clathrate, the carbon dioxide content of the deposit, the temperature of the deposit, the pressure of the deposit, and whether the barrier has ruptured.

* * * * *